United States Patent [19]

Purves

[11] Patent Number: 4,870,782
[45] Date of Patent: Oct. 3, 1989

[54] AUTOMATIC GATE OPENING AND CLOSING DEVICE

[76] Inventor: Murray Purves, Lot 110, Cooyong Road, Terrey Hills, NSW. 2084, Australia

[21] Appl. No.: 47,329

[22] Filed: May 8, 1987

[30] Foreign Application Priority Data

May 9, 1986 [AU] Australia ............................. PH5818

[51] Int. Cl.⁴ ............................................. E05B 65/00
[52] U.S. Cl. ..................................... 49/364; 49/394; 49/58
[58] Field of Search ................. 49/364, 293, 294, 301, 49/289, 394, 381, 58

[56] References Cited

U.S. PATENT DOCUMENTS

| | | | |
|---|---|---|---|
| 2,718,079 | 9/1955 | Strey | 49/364 |
| 2,982,036 | 5/1961 | Piper | 49/364 |
| 3,381,412 | 5/1968 | Brotherson | 49/364 |

FOREIGN PATENT DOCUMENTS

| | | | |
|---|---|---|---|
| 0228255 | 4/1960 | Australia | 49/364 |
| 0502165 | 5/1954 | Canada | 49/364 |

Primary Examiner—Kenneth J. Dorner
Assistant Examiner—Gerald A. Anderson
Attorney, Agent, or Firm—Birch, Stewart, Kolasch & Birch

[57] ABSTRACT

A device for operating a gate includes a pushbar which is located on each side of the gate and which is attached by cable to a spring-loaded bolt from a latch on the gate post. Each pushbar includes a sleeve mounted for free rotation relative thereto. The latch means is located adjacent the bottom of the gate so as to minimize the possibility of animals inserting their heads under the latch and opening the gate.

4 Claims, 3 Drawing Sheets

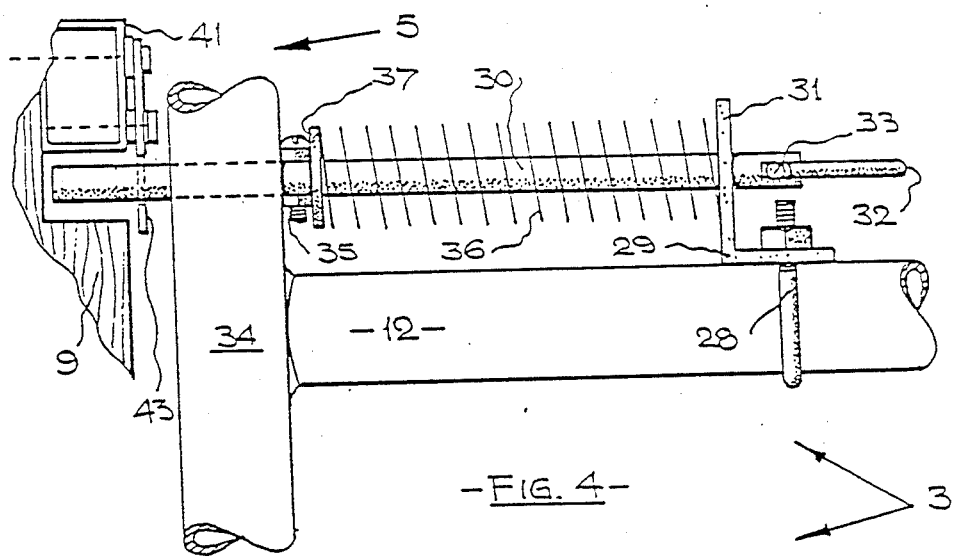
FIG. 4
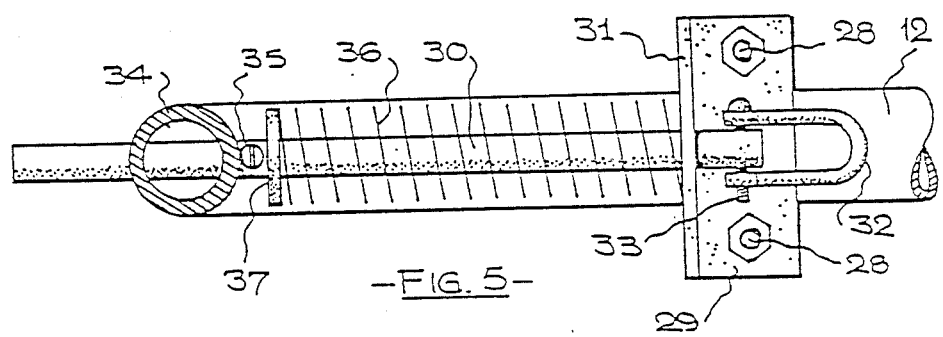
FIG. 5
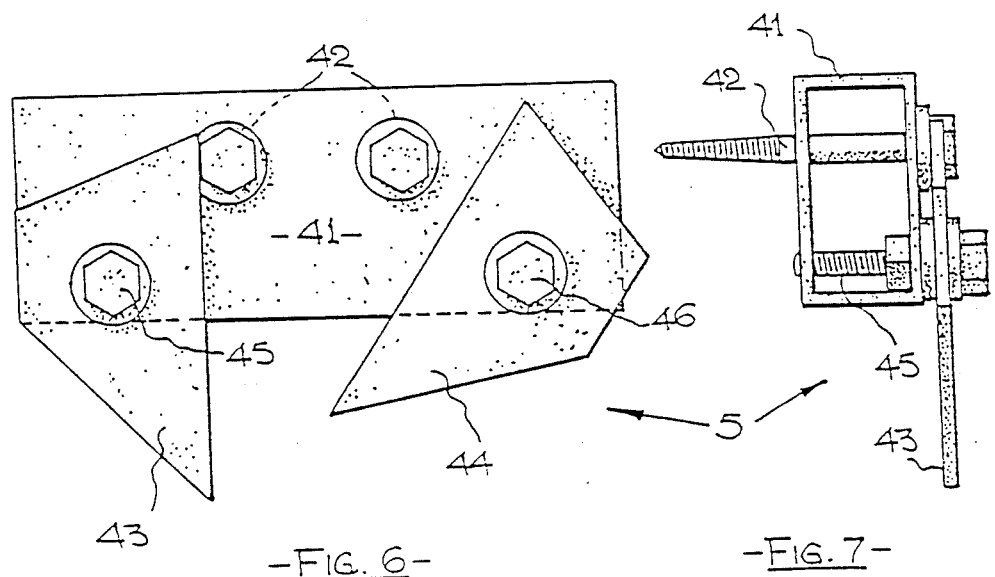
FIG. 6
FIG. 7

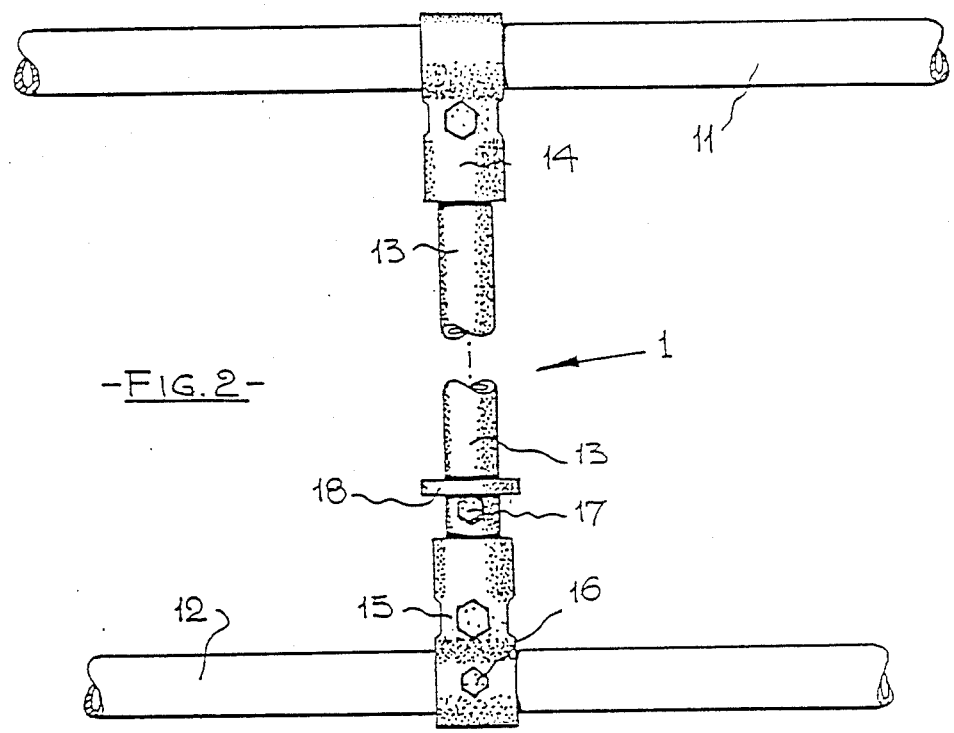
-FIG.2-
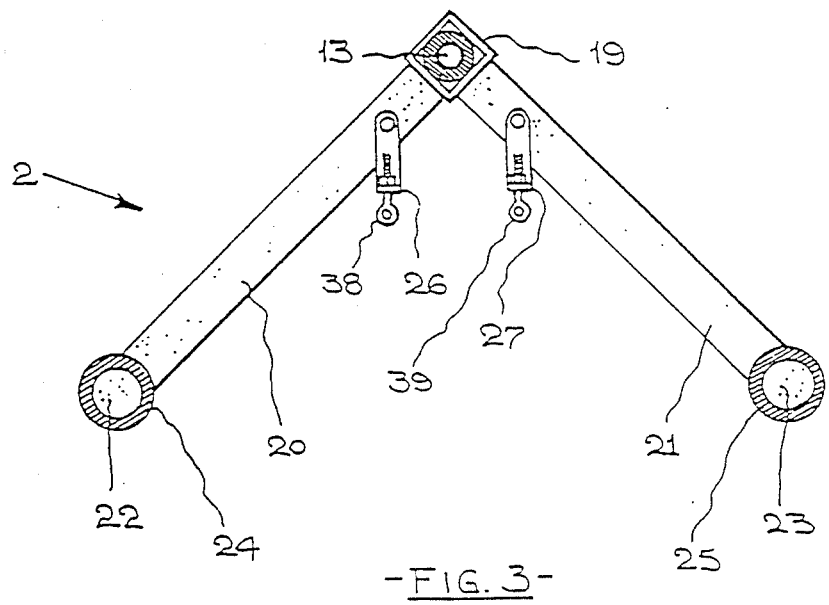
-FIG.3-

AUTOMATIC GATE OPENING AND CLOSING DEVICE

TECHNICAL FIELD

THIS INVENTION relates to gates and more particularly to a device for opening and closing such a gate as, say, a farm gate.

BACKGROUND ART

Apart from the unfortunate fact that farm gates tend to get left open by unknowledgeable or careless people, it is a tiresome thing to have to open and close gates to enable passage of a horse or a motor vehicle.

"Automatic" gates are known and generally fall into two categories—boom gates and gates which move into a horizontal position on the ground. Both kinds are mechanically complex and expensive—one boom-operated 12 foot gate being presently on the market for over $A1000. Moreover a person on foot or horseback will have difficulty in operating the trip mechanism and often a separate wicket is provided beside the main gate.

DISCLOSURE OF INVENTION

It is therefore an object of the present invention to overcome the above and other disadvantages by the provision of an automatic gate opening and closing device. The device comprises a kingpost (13) attached to, and extending substantially vertically between, an upper frame member (11) and a lower frame member (12) of a gate. A pair of pushbars (20, 22; 21, 23) are pivotally mounted on said kingpost (13) for limited pivotal movement thereabout. A first pushbar (20, 22) is disposed on one side of said gate and a second pushbar (21, 23) is disposed on the other side of said gate.

The pushbars are substantially "L" in formation and have a base extending outwardly from said kingpost and an upwardly extending arm portion adjacent a distal end thereof. The arm is substantially parallel to and spaced apart from the kingpost. Each arm includes a sleeve adapted for free rotation mounted thereabout and the pushbars and sleeves are located adjacent a bottom of the gate so as to minimize the possibility of an animal operating the device to open the gate. A spring-urged bolt is located on or adjacent to the lower frame member of the gate such as to prevent an animal from wedging its head under the bolt. The spring-urged bolt is located adjacent a free, outer frame member or end rail of the gate and is adapted to maintain the gate in a closed position when the bolt engages with a co-acting latch means in, or on a gate post. A cable extends between a base of each pushbar and the bolt, so that when a positive inward force is applied to an upwardly extending arm of a pushbar and a sleeve, turning of the pushbar assembly is effected. Movement of the pushbar will cause a cable to act to disengage the bolt from the latch means, to cause the gate to spring open and such that when such a force is completed or removed, a cable will restore said pushbars to an initial position of rest such that said gate can move into a closed position to enable the bolt to engage with the latch means.

Preferably, the kingpost is provided with a square-section sleeve fitting thereover; there being, secured to said sleeve, a pair of base disposed at 90° to each other so that one base is disposed at each side of the gate; a substantially vertically extending arm is provided at the free end of each base and includes a rotating elastomeric covering; and an adjustable cable anchor pivotally attached to each base adjacent the kingpost.

Ideally, the latch means may include a body portion attachable to the gatepost and a spaced-apart pair of wings pivotally mounted thereon, each wing being able to be caused to pivot towards the other wing when struck by the bolt as the gate approaches the closed position but being unable to pivot in the opposite direction, thereby retaining the bolt in the rest position between the wings.

Advantageously, one end of the bolt should extend through an end-rail of the gate, the other end of the bolt being supported in a bracket securable to the bottom rail of the gate; the bolt being able to be axially moved in a first direction when pulled back by a said cable attached to a shackle on the bolt and, in a second direction, being able to be returned to the rest position under the influence of a compression spring surrounding the bolt between the end-rail and the bracket.

BRIEF DESCRIPTION OF DRAWINGS

The present invention will become more fully understood from the detailed description given hereinbelow and the accompanying drawings which are given by way of illustration only, and thus are not limitative of the present invention, and wherein: with reference to the accompanying drawings in which:

FIG. 2 shows the disposition of a kingpost;

FIG. 3 is a plan view of a pushbar assembly;

FIG. 4 is a side elevation of a spring-loaded bolt;

FIG. 5 is a corresponding plan view;

FIG. 6 is a front elevation of a latch or "two-way closer", and

FIG. 7 is a corresponding side elevation.

Throughout the drawings, like integers are referenced by the same numeral.

DESCRIPTION OF THE EMBODIMENT

Figure 1:
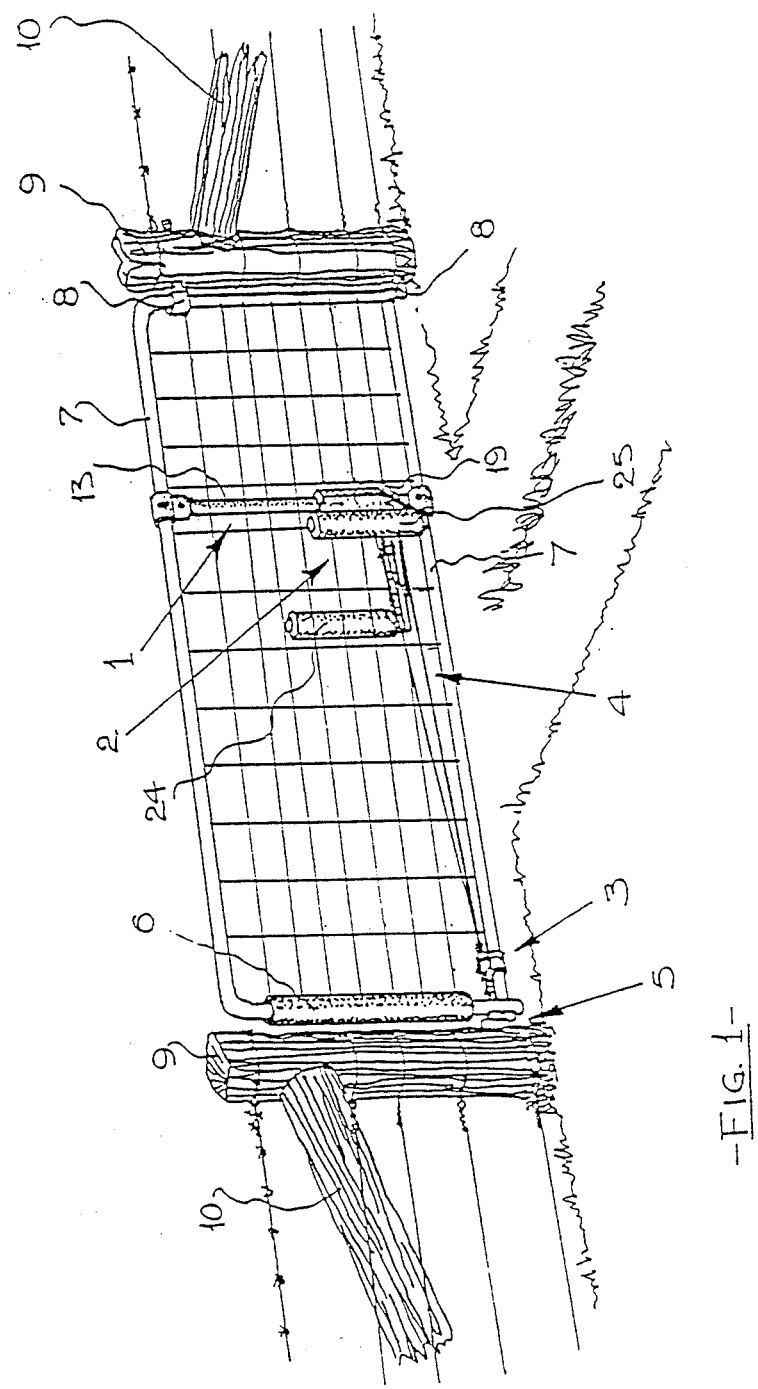
FIG. 1 is a general perspective view of a gate fitted with an inventive device.

FIG. 1 illustrates the various component assemblies of the device attached to a gate. These assemblies are a kingpost 1; pushbars 2; a spring-loaded bolt 3; twinned actuating cables 4; and a latch or closer 5. In addition, the gate may well be provided with an elastomeric fender or buffer 6. The gate illustrated is by way of example only and represents a 12-foot, weld-mesh gate, typically with a galvanized-pipe frame 7. Thus, while the gate is a conventional enough one, a point that should be stressed in that, if the gate does not have a "fall" from hinge-end to fastening-end (such as most existing gates will have) then the hinges 8 must be adjusted or packed so as to achieve a suitable "fall". This is so that the gate will gently swing towards the closed condition under gravity. Moreover, the gateposts 9 and their strainer-posts 10 should be sturdily set, although this should be standard practice for any well-constructed gate.

FIG. 2 shows a kingpost assembly 1 which is adapted to extend between a top rail 11 and a bottom rail 12 of a gate to which the device is fitted. Kingpost assembly 1 includes a length 13 of pipe, such as galvanized pipe, and a pair of so-called "Downee Fittings" 14 and 15. The lowermost of these fittings, 15, also is drilled to accept a bolt 16 so as to enable it to be rigidly affixed, via an aligned bolthole, to bottom rail 12; this ensures that there will be no relative movement between fitting and rail. A further bolt 17 extends through pipe 13 for the purpose of supporting a washer 18 upon which, in turn, is supported a square-section sleeve 19, to be seen, in plan, in FIG. 3.

FIG. 3 is a plan view of a pushbar assembly. Square-sectioned sleeve 19 fits over pipe 13 of kingpost assembly 1 and is supported, as before stated, on the washer 18. To sleeve 19 is affixed, as by welding, a pair of bases 20, 21 arranged so that one arm is disposed on either side of the gate. Sleeve 19 should be as short as is commensurate with a good but "not too sloppy" rotary action.

Upstanding from the free ends of bases 20 and 21 are arms 22 and 23, provided respectively with elastomeric sleeves 24 and 25. Pivotally attached to the arms, adjacent the kingpost, are adjustable cable anchors 26 and 27.

Turning now to FIGS. 4 and 5, a spring-loaded belt assembly 3 is attached to bottom rail 12 by a U-bolt 28 extending through a flanged plate 29. Spring-loaded bolt assembly 3 also includes a shaft 30, one end of which passes through a flange 31 of flanged plate 29 and terminates in a shackle 32 held by a shackle-pin 33, and the other end of which passes through an end-rail 34 of the gate and is prevented from over-movement by bolt 35. A helical compression spring 36 surrounds shaft 30, held between flange 31 of the flanged plate, or bracket, 29 and a washer 37.

A pair of cables, generally referenced 4 in FIG. 1, extends between shackle 32 of the spring-loaded bolt-assembly and eye-bolts 38 and 39 of cable anchors 26 and 27. It will be appreciated from the foregoing that when pushbar assembly 2 is rotated about kingpost assembly pipe 13, one of the cables will operate so as to withdraw bolt shaft 30 from the latch means 5 on gatepost 9 to thus permit the gate to be swung open.

As generally referenced 5 in FIG. 1 and shown in detail in FIGS. 6 and 7, the latch, or "two-way closer" means comprises a tubular body portion 41 attachable to the gatepost 9 by a pair of coach-screws 42, and a pair of wings 43 and 44 pivoting about bolts 45 and 46. As will be clear, the heads of coach-screws 42 also act as stops to prevent the lower portions of the wings from being swung outwardly.

The inventive device operates in the following way:- a vehicles approaches the gate at reduced speed and gently nudges one of the arms, causing the whole pushbar assembly to pivot about the kingpost. The appropriate cable withdraws the shaft of the spring-loaded bolt assembly from the latch on the gatepost, as the pushbar assembly continues to pivot, so that when the shaft clears the wing the gate springs open so that the vehicle can pass through. If the vehicle stalls or does not pass through in time, the elastomeric sleeve will prevent damage to bodywork.

With the vehicle now through the gate and on its way, the gate begins to close under gravity. When the gate is nearly closed, the protruding shaft pushes aside one of the pivoted wings but its swing is arrested by its coming into contact with the inner edge of the other wing. As the gate gently rebounds, the shaft is arrested by the first wing which has since dropped back to a vertical position, thus fastening the gate without manual manipulation.

In the preferred form of the invention shown in particular in the accompanying drawings, the pushbars have a substantially "L" configuration, having bases and upstanding arms. The bases are shown as 20 and 21 and the upstanding vertical arms as 22 and 23 in FIG. 3 of the accompanying drawings. The upstanding arms 22 and 23 mount for free rotation thereabout, sleeves 24 and 25 which are preferably of an elastomeric material. As will be appreciated from the accompanying drawings, the pushbars extend outwardly from each side of the gate and thus a freely rotatable sleeve is provided on each side of the gate.

In the preferred form of the invention, the pushbars and sleeves are positioned on the gate so as to be adjacent the bottom thereof.

When it is desired to open the gate, such as by using a motor vehicle, the motor vehicle is moved in against the arms of the pushbars and the sleeves and a positive forward movement is applied to the arms and sleeves which will to a certain extent compress the sleeves and move the sleeves and arms of the pushbars inwardly, and substantially arcuately towards the gate. This will in turn cause the ropes or wires to actuate the opening bolt and opening device.

The latch means of the gate of the present invention is preferably mounted on or adjacent the bottom bar of the gate so that it is usually below the body surface of motor vehicles being used, for example, motor vehicles being used to open the gate. Further, the location is sufficiently low that an animal is unable to place its head under the bolt or locking bar.

It should be appreciated therefore that the possibility of the gate of the present invention being opened by animals, is highly unlikely. Likewise, it is highly unlikely, due to the construction and features of the present invention, that animals would be able to wedge or place their heads underneath the locking arrangement or bolt so as to force their way through by for example twisting the gate.

It should be appreciated that the present invention has been described by way of example only and that modifications and improvements may be made without department from the scope thereof as defined by the appended claims.

I claim:

1. An automatic opening and closing device for a substantially elongated and transverse gate comprising:

a kingpost fixedly attached to, and extending substantially vertically between, an upper frame member and a lower frame member of said gate;

a pushbar assembly, including a pair of pushbars, being pivotally mounted on and relative to said kingpost;

a first pushbar being disposed on one side of said gate and a second pushbar being disposed on the other side of said gate;

said pushbars being generally "L" shaped in formation and each having a base extending outwardly from said kingpost and an upwardly extending arm portion substantially parallel to but spaced apart from said kingpost;

each arm position mounting a freely rotatable sleeve, and said pushbars and sleeves being located adjacent a lower portion of said gate;

a spring-urged bolt being located adjacent to said lower frame member of the gate for preventing an animal from wedging its head under said bolt, said spring-urged bolt being located adjacent a free outer frame member of said gate and being adapted to maintain said gate in a closed position when said bolt engages with a co-acting latch means mounted to a gate post; and a cable extending between the base of each push bar and said bolt, so that applying a force to an upwardly extending arm portion of a pushbar and a sleeve in a general direction toward said gate causes turning movement of said pushbar assembly and tensioning of one cable for disengaging said bolt from said latch means, to allow said gate to spring open, and removing the force allows said one cable to restore said pushbar assembly to an initial position of rest so that when said gate returns to a closed position, said bolt can reengage with said latch means.

2. A device according to claim 1, wherein said pushbar assembly includes a substantially square section sleeve rotatably fitted about said kingpost, said bases extending outwardly from said square section sleeve and being disposed substantially 90° relative to each other, such that one base is disposed at each side of said gate, one of said arm portions being provided at an end of each base, said freely rotatable sleeves being mounted for rotation on said arm portions and being provided with an elastomeric covering, and adjustable cable anchor means operatively mounted to said bases for pivotally attaching a cable to each base adjacent said kingpost.

3. A device according to claim 1, wherein the latch means includes a body portion and a pair of spaced apart wings pivotally mounted thereon so as to be capable of pivoting towards each other when struck by said bolt, such as when the gate approaches the closed position; and means restricting the pivoting of said wings away from each other so as to enable the retention of said bolt in a rest position between said wings.

4. A device according to claim 1, wherein one end of the bolt extends through said free outer frame member of said gate, the other end of said bolt being supported in a bracket secured to said lower frame member of said gate, said bolt being movable in a first direction when pulled by said cable attached to a shackle on said bolt and in a second direction to a rest position under the influence of a compression spring surrounding said bolt and operatively mounted between said end rail and said bracket.

* * * * *